United States Patent
Kim

(10) Patent No.: US 9,017,459 B2
(45) Date of Patent: Apr. 28, 2015

(54) APPARATUS FOR REMOVING DUST AND OFFENSIVE ODOR GENERATED FROM ASCON

(71) Applicant: Metro Engineering Co., Ltd., Incheon (KR)

(72) Inventor: Gyeong Jun Kim, Bucheon-si (KR)

(73) Assignees: Kyeong Jun Kim, Gyeonggi-do (KR); Hyeong Su Han, Seoul (KR); Yup An, Incheon (KR); Jung Hwan Sung, Gyeonggi-do (KR); Young Jung Kim, Incheon (KR); Jae Min Song, Incheon (KR); Yun Geun Ma, Incheon (KR); Duk Hyung Cho, Incheon (KR)

(*) Notice: Subject to any disclaimer, the term of this patent is extended or adjusted under 35 U.S.C. 154(b) by 0 days.

(21) Appl. No.: 14/346,385

(22) PCT Filed: Apr. 3, 2013

(86) PCT No.: PCT/KR2013/002755
§ 371 (c)(1),
(2) Date: Mar. 21, 2014

(87) PCT Pub. No.: WO2013/176397
PCT Pub. Date: Nov. 28, 2013

(65) Prior Publication Data
US 2015/0075382 A1   Mar. 19, 2015

(30) Foreign Application Priority Data

May 24, 2012  (KR) .................. 10-2012-0055321

(51) Int. Cl.
*B01D 53/24* (2006.01)
*B01D 45/12* (2006.01)
*B01D 53/04* (2006.01)
*B01D 53/14* (2006.01)
*B01D 53/00* (2006.01)
*B01D 50/00* (2006.01)
*B01D 36/04* (2006.01)

(52) U.S. Cl.
CPC ............. *B01D 45/12* (2013.01); *B01D 53/04* (2013.01); *B01D 53/1487* (2013.01); *B01D 53/002* (2013.01); *B01D 50/002* (2013.01); *B01D 2253/102* (2013.01); *B01D 2252/103* (2013.01); *B01D 2257/708* (2013.01); *B01D 36/04* (2013.01); *B01D 36/045* (2013.01); *B01D 53/24* (2013.01)

(58) Field of Classification Search
CPC ....... B01D 3/002; B01D 3/004; B01D 3/1487; B01D 3/24; B01D 45/12; B01D 50/002; B01D 2253/102; B01D 2252/103; B01D 2257/708; B01D 36/04; B01D 36/045
USPC ..................................... 96/134–136
See application file for complete search history.

(56) References Cited

U.S. PATENT DOCUMENTS

| 4,328,008 | A  | * | 5/1982  | Muenger et al. ............ 48/197 R |
| 7,070,637 | B1 | * | 7/2006  | Zhang ............................. 55/347 |
| 7,159,723 | B2 | * | 1/2007  | Hilpert et al. ................. 209/710 |
| 7,162,770 | B2 | * | 1/2007  | Davidshofer ................... 15/353 |
| 7,175,364 | B2 | * | 2/2007  | Gaertner et al. ................ 404/76 |
| 2007/0227105 | A1 | * | 10/2007 | Jacobson ....................... 55/345 |
| 2011/0041393 | A1 | * | 2/2011  | Sugita et al. .................. 44/626 |
| 2011/0232284 | A1 | * | 9/2011  | Natta et al. .................... 60/653 |
| 2013/0199137 | A1 | * | 8/2013  | HALLGREN et al. ......... 55/393 |
| 2014/0109800 | A1 | * | 4/2014  | Zurhove ....................... 106/761 |

FOREIGN PATENT DOCUMENTS

| KR | 1019970005361 | 2/1997 |
| KR | 1007790700000 | 12/2007 |
| KR | 1020110052350 | 5/2011 |

* cited by examiner

*Primary Examiner* — Christopher P Jones
(74) *Attorney, Agent, or Firm* — IPLA P.A.; James E. Bame

(57) ABSTRACT

An apparatus for removing dust and offensive odor generated from ascon includes: a centrifugal dust collection unit which forcibly sucks offensive odor-causing materials, harmful gas and dust generated from the ascon, produced in an ascon producing unit, via a pipe so as to discharge the dust having a relatively large particle size via a hopper provided at the lower end thereof to the outside by means of a rotary valve while conveying air and relatively fine dust to a filtration-type dust collection unit via a pipe provided at the upper side thereof; the filtration-type dust collection unit for filtering the offensive odor-causing materials, harmful gas and fine dust having passed through the centrifugal dust collection unit by means of a filter while discharging the remaining fine dust or the like to the outside by a screw provided at the lower end of the hopper; a first cooling unit for condensing the harmful gas and offensive odor-causing materials of 150° C., supplied from the filtration-type dust collection unit, by cooling the same to 40~50° C. using a cooling tower and thus removing and separating the moisture and the offensive odor-causing materials; a second cooling unit for condensing the offensive odor-causing materials and harmful gas of 40~50° C., having passed through the first cooling unit, by re-cooling the same to 20° C. or lower by a condenser and thus removing and separating the moisture and offensive odor-causing materials so as to prevent a white plume phenomenon; an adsorption unit for removing volatile organic compounds (VOCs) by adsorbing and filtering the offensive odor-causing materials and harmful gas of 20° C., having passed through the second cooling unit, using a active carbon filter; and a discharge unit configured such that spray pipes are provided therein in stages so as to remove water-soluble offensive odor-causing materials in the air, from which the volatile organic compounds (VOCs) have been removed via the adsorption unit, by spraying water via a plurality of spray nozzles provided at each of the spray pipes, and a discharge pipe is provided at the upper side thereof so as to discharge fresh air, wherein a turbo fan is provided between the filtration-type dust collection unit and the first cooling unit, and wherein an oil-water separation tank and a water collection tank are additionally provided between the first cooling unit and the second cooling unit such that the oil-water separation tank separates harmful oil and water from each other by discharging the cooled and condensed moisture and offensive odor-causing materials via pipes, and the water collection tank collects only water separated from the oil-water separation tank. The apparatus of the present invention can prevent environmental pollution by removing or minimizing the offensive odor and dust by a batch system, wherein air pollutants or any other harmful dust generated in the ascon producing unit is removed or minimized regardless of ducted emission and fugitive emission. Particularly, according to the offensive odor prevention plan, the step for mixing AP oil and heated aggregate and the step for loading the ascon onto a truck, which are considered to be the main steps for generating the offensive odor, are preformed when producing the ascon by using a new aggregate, while the AP oil vapor is condensed so as to be removed by the first cooling unit, and untreated materials are removed by the second cooling unit in consideration of the physical and chemical properties of the AP oil during re-generation of the waste ascon. Therefore, the apparatus of the present invention is mounted at the rear end of an existing asphalt plant collection facility such that the moisture which is evaporated in the step for drying the AP oil vapor and the aggregate is first condensed and collected, and the volatile organic compounds (VOCs) and the moisture are secondarily condensed and collected by the condenser, the untreated offensive odor-causing materials are collected in the adsorption unit and the discharge unit. Thus, effects of decreasing offensive odor and preventing a white plume phenomenon are exhibited.

3 Claims, 5 Drawing Sheets

APPARATUS FOR REMOVING DUST AND OFFENSIVE ODOR GENERATED FROM ASCON

BACKGROUND

The present invention relates to an apparatus for removing dust and offensive odor generated from ascon, and, more particularly, to an apparatus for removing dust and offensive odor generated from ascon, wherein air pollutants, harmful dust and offensive odor generated during the production of ascon are removed or minimized by a batch system, thus preventing environmental pollution.

Generally, ascon (asphalt-concrete) is produced by mixing an aggregate, such as gravel, crushed stone or the like, and an additive with concrete obtained by the fractional distillation of crude oil and heating the mixture under a predetermined condition, and is generally used as a road pavement material or the like.

A process of producing ascon proceeds as follows. First, an aggregate transferred from a cold bin to a conveyor belt passes through a dryer to remove moisture from the aggregate, the moisture-removed aggregate is heated to a temperature at which the aggregate can be suitably mixed with asphalt oil (AP oil), the heated aggregate passes through a hot elevator, a hot screen and a hot bin to adjust the particle size thereof, and then the particle size-adjusted aggregate is introduced into a mixer and then mixed with a suitable amount of heated asphalt oil (AP oil) supplied from an asphalt oil storage tank through a measuring tank, thereby producing ascon.

The produced ascon is immediately loaded on a truck, and then is applied to a road pavement site. The process of producing ascon needs five major units including a 'storage unit' for storing an aggregate and stone powder, a 'drying unit' (dryer) for drying an aggregate and the like, a 'mixing unit' for mixing a heated aggregate with asphalt, a 'dust collecting unit' for preventing air pollution, and a 'shipping unit' for shipping ascon. Among the five major units, four, excluding the storage unit, are closely related with the discharge of offensive odor and pollutants.

Methods of discharging air pollutants from the process of producing ascon are largely classified into two types: ducted emission and fugitive emission.

Ducted emission is referred to as a method of discharging air pollutants after purifying them using pollutant treatment equipment. In this case, air pollutants are chiefly discharged from a hot elevator, a hot screen, a hot bin or a mixer.

In contrast, fugitive emission is referred to as a method of discharging fly dust generated during the procedure of shipping ascon or the procedure of storing and conveying an aggregate.

That is, one of the major air pollutants is an organic fume generated by the volatilization of dust and asphalt (AP) oil. The organic fume, which is an offensive odor-causing material, is discharged from the process of mixing an aggregate dried by a dryer with AP oil supplied from an AP oil storage tank in a hot mixer and the process of loading a truck with the produced ascon.

The major air pollutants includes ammonia-based compounds, aldehydes, aromatics, which are obtained by evaporation of asphalt (AP) oil at high temperature, in addition to the organic fume (volatile organic compounds (VOCs), which is obtained by the mixing of high-temperature aggregate and asphalt (AP) oil). Specific examples thereof are given in Table 1 below.

TABLE 1

| Class. | Ammonia-based compounds | | Aldehydes | | Aromatics | | |
|---|---|---|---|---|---|---|---|
| Components | ammonia | trimethylamine | isobutyl aldehyde | valeric aldehyde | toluene | xylene | styrene |
| Minimum detectable concentration | 0.15 | 0.00011 | 0.0009 | 0.00071 | 0.92 | 0.11 | 0.033 |
| Type of odor | urine | rotten fish | mold | unpleasant | rubber | sweet | rubber |
| Measured concentration | 2.2 | 0.003 | 0.91 | 0.034 | 6.9 | 10.0 | 0.41 |

Further, the conditions and methods of deodorizing air pollutants are given in Table 2 below.

TABLE 2

| Class. | Ammonia-based compounds | | Aldehydes | | Aromatics | | |
|---|---|---|---|---|---|---|---|
| Components | ammonia | trimethylamine | isobutyl aldehyde | valeric aldehyde | toluene | xylene | styrene |
| Minimum detectable concentration | 0.15 | 0.00011 | 0.0009 | 0.00071 | 0.92 | 0.11 | 0.033 |
| Measured concentration | 2.2 | 0.003 | 0.91 | 0.034 | 6.9 | 10.0 | 0.41 |
| Concentration index of offensive odor | 15 | 28 | 1012 | 48 | 8 | 91 | 13 |
| Combustion method | ◯ | ◯ | ◯ | ◯ | ◯ | ◯ | ◯ |

TABLE 2-continued

| Class. | Ammonia-based compounds | | Aldehydes | | Aromatics | | |
|---|---|---|---|---|---|---|---|
| | | | isobutyl | valeric | | | |
| Components | ammonia | trimethylamine | aldehyde | aldehyde | toluene | xylene | styrene |
| Absorption method | ○ | ○ | X | X | X | X | X |
| Adsorption method | ○ | ○ | ○ | ○ | ○ | ○ | ○ |
| Biological method | ○ | ○ | ○ | ○ | Δ | Δ | Δ |
| Neutralization method | ○ | ○ | X | X | X | X | X |

○: treatable
Δ: treatable (suitable contact time)
X: non-treatable
Concentration index = measured concentration/minimum detectable concentration Further, the minimum detectable concentrations of air pollutants emitting offensive odor are given in Table 3 below.

TABLE 3

Minimum detectable concentrations
of air pollutants emitting offensive odor
(unit: ppm)

| No. | Components | Minimum detectable concentration |
|---|---|---|
| 1 | Ammonia | 0.15 |
| 2 | Methyl mercaptan | 0.00012 |
| 3 | Hydrogen sulfide | 0.0005 |
| 4 | Methyl sulfide | 0.00012 |
| 5 | Methyl disulfide | 0.00028 |
| 6 | Trimethylamine | 0.00011 |
| 7 | Acetaldehyde | 0.0015 |
| 8 | Propionaldehyde | 0.0015 |
| 9 | N-butylaldehyde | 0.00032 |
| 10 | Iso-butylaldehyde | 0.0009 |
| 11 | N-valeric aldehyde | 0.00071 |
| 12 | Iso-valeric aldehyde | 0.00019 |
| 13 | Iso-butanol | 0.012 |
| 14 | Ethyl acetate | 0.25 |
| 15 | Methyl isobutyl ketone | 0.17 |
| 16 | Toluene | 0.92 |
| 17 | Styrene | 0.033 |
| 18 | Xylene | 0.11 |
| 19 | Propionic acid | 0.0024 |
| 20 | N-butyl acid | 0.000068 |
| 21 | N-valeric acid | 0.0001 |
| 22 | Iso-valeric acid | 0.000053 |

As described above, offensive odor and pollutants generated during the process of producing ascon are principal causes of severe environmental pollution, and are problematic as follows.

First, they cannot be easily observed by the naked eye.

Second, since they are discharged sporadically rather than continuously from open-air facilities and field operations, and are also discharged from only a single source, their generation sources are various, and investment efforts for their removal are less effective compared to removal of other air pollutants.

Third, since their characteristics are complicated in many aspects due to the discharge of various kinds of materials to the air, the results of environmental pollution caused thereby are attributable to various kinds of compounds rather than to a single material.

Fourth, it is very difficult to objectively measure, via an analyzer, human perception of various offensive odors and pollutants detected in a unit of ppm, and the detection of offensive odors may change depending on time, place, concentration and composition.

However, the deodorization methods given in Table 2 above are not perfect because they have their respective advantages and disadvantages. Therefore, the most effective deodorization method must be selected in consideration of the kind and concentration of offensive odor-causing materials, process change, installation area, work line, temperature, humidity, airflow, secondary pollution management measures, fuel usage and the like. However, there are many difficulties in excessive installation cost, management cost, maintenance cost and the like.

In order to solve the above-mentioned problems, an apparatus has been proposed for removing dust and offensive odor using a dryer in an ascon plant (Korean Patent Application No. 10-2007-37310, filed on Apr. 17, 2007, and then registered). The technical gist thereof is described as follows.

An apparatus for removing dust and offensive odor using a dryer in an ascon plant, in which the ascon plant includes a dryer for heating an aggregate discharged from a cold bin, a hot elevator for conveying the aggregate heated by the dryer, an additive supply unit, a dust supply unit, and a mixer for mixing the heated aggregate conveyed by the hot elevator with an additive supplied from the dust supply unit and dust supplied from the dust supply unit to produce ascon and discharging the produced ascon through an outlet, the apparatus comprising: an intake fan for forcibly sucking offensive odor emitted from the inside of the mixer and discharging the offensive odor to the dryer; a back filter disposed between the mixer and the intake fan and serving to collect dust in the mixer and then transfer the collected dust to the hot elevator; a hood for forcibly sucking the offensive odor generated at the time of discharging the ascon through the outlet of the mixer and then discharging the offensive odor to the dryer.

The dryer of the apparatus is provided with an intake fan for sucking air for fuel combustion, and the intake fan forcibly sucks air mixed with offensive odors through the hood.

The above-mentioned registered technology can remove parts of harmful gases and the like generated from ascon, but, as described above, is problematic in that it cannot be completely applied under various environments or circumstances.

SUMMARY OF THE INVENTION

Accordingly, the present invention has been devised to solve the above-mentioned problems, and an object of the present invention is to prevent environmental pollution by removing and minimizing air pollutants and other harmful dust generated during the process of producing ascon using a batch system, regardless of ducted emission or fugitive emission.

In order to accomplish the above object, an aspect of the present invention provides an apparatus for removing dust and offensive odor generated from ascon, including: a centrifugal dust collection unit which forcibly sucks offensive odor-causing materials, harmful gas and dust generated from the ascon, produced in an ascon producing unit, via a pipe so as to discharge the dust having a relatively large particle size via a hopper provided at the lower end thereof to the outside by means of a rotary valve while conveying air and relatively fine dust to a filtration-type dust collection unit via a pipe provided at the upper side thereof; the filtration-type dust collection unit for filtering the offensive odor-causing materials, harmful gas and fine dust having passed through the centrifugal dust collection unit by means of a filter while discharging the remaining fine dust or the like to the outside by a screw provided at the lower end of the hopper; a first cooling unit for condensing the harmful gas and offensive odor-causing materials of 150° C., supplied from the filtration-type dust collection unit, by cooling the same to 40~50° C. using a cooling tower and thus removing and separating the moisture and the offensive odor-causing materials; a second cooling unit for condensing the offensive odor-causing materials and harmful gas of 40~50° C., having passed through the first cooling unit, by re-cooling the same to 20° C. or lower by a condenser and thus removing and separating the moisture and offensive odor-causing materials so as to prevent a white plume phenomenon; an adsorption unit for removing volatile organic compounds (VOCs) by adsorbing and filtering the offensive odor-causing materials and harmful gas of 20° C., having passed through the second cooling unit, using a active carbon filter; and a discharge unit configured such that spray pipes are provided therein in stages so as to remove water-soluble offensive odor-causing materials in the air, from which the volatile organic compounds (VOCs) have been removed via the adsorption unit, by spraying water via a plurality of spray nozzles provided at each of the spray pipes, and a discharge pipe is provided at the upper side thereof so as to discharge fresh air, wherein a turbo fan is provided between the filtration-type dust collection unit and the first cooling unit, and wherein an oil-water separation tank and a water collection tank are additionally provided between the first cooling unit and the second cooling unit such that the oil-water separation tank separates harmful oil and water from each other by discharging the cooled and condensed moisture and offensive odor-causing materials via pipes, and the water collection tank collects only water separated from the oil-water separation tank.

The above-structured apparatus according to the present invention can prevent environmental pollution by removing or minimizing the offensive odor and dust by a batch system, wherein air pollutants or any other harmful dust generated in the ascon producing unit is removed or minimized regardless of ducted emission and fugitive emission. Particularly, according to the offensive odor prevention plan, the step for mixing AP oil and heated aggregate and the step for loading the ascon onto a truck, which are considered to be the main steps for generating the offensive odor, are preformed when producing the ascon by using a new aggregate, while the AP oil vapor is condensed so as to be removed by the first cooling unit, and untreated materials are removed by the second cooling unit in consideration of the physical and chemical properties of the AP oil during re-generation of the waste ascon.

Therefore, the apparatus of the present invention is mounted at the rear end of an existing asphalt plant collection facility such that the moisture which is evaporated in the step for drying the AP oil vapor and the aggregate is first condensed and collected, and the volatile organic compounds (VOCs) and the moisture are secondarily condensed and collected by the condenser, the untreated offensive odor-causing materials are collected in the adsorption unit and the discharge unit. Thus, effects of decreasing the offensive odor and preventing the white plume phenomenon are exhibited.

As described above, although the preferred embodiments of the present invention have been disclosed for illustrative purposes, those skilled in the art will appreciate that various modifications, additions and substitutions are possible, without departing from the scope and spirit of the invention as disclosed in the accompanying claims.

DETAILED DESCRIPTION OF THE INVENTION

Hereinafter, the apparatus for removing dust and offensive odor generated from ascon according to the present invention will be described in detail with reference to the attached drawings.

Figure 1:
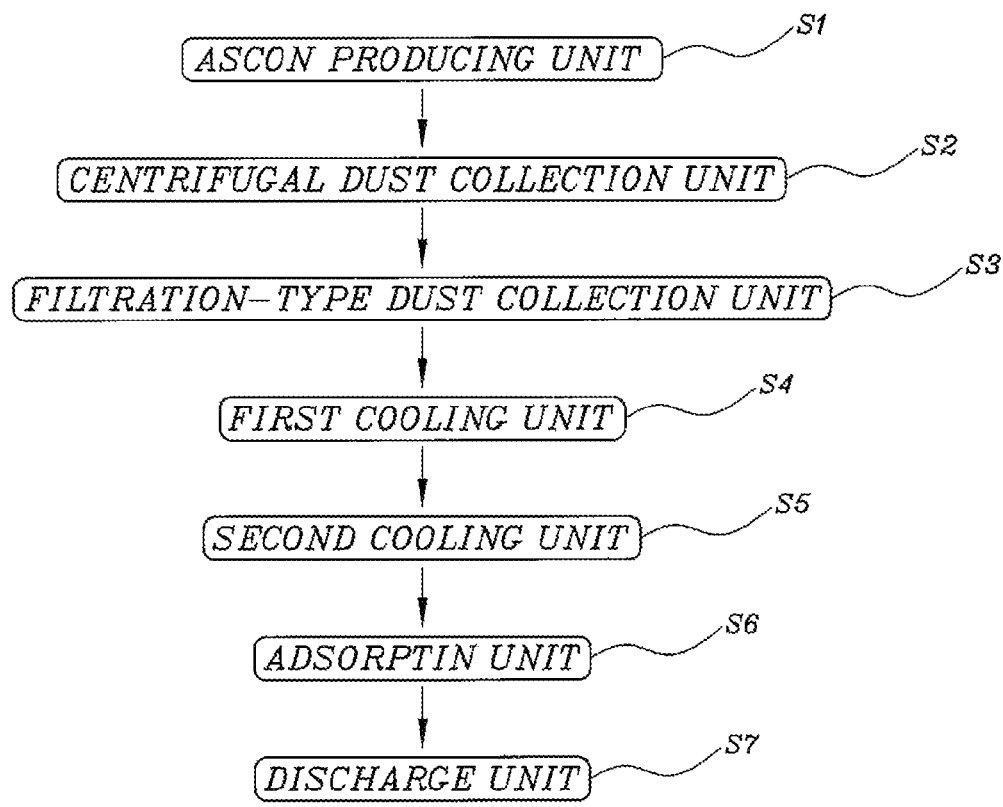
FIG. 1 is a block diagram of an apparatus for removing dust and offensive odor generated from ascon according to the present invention.
Figure 2:
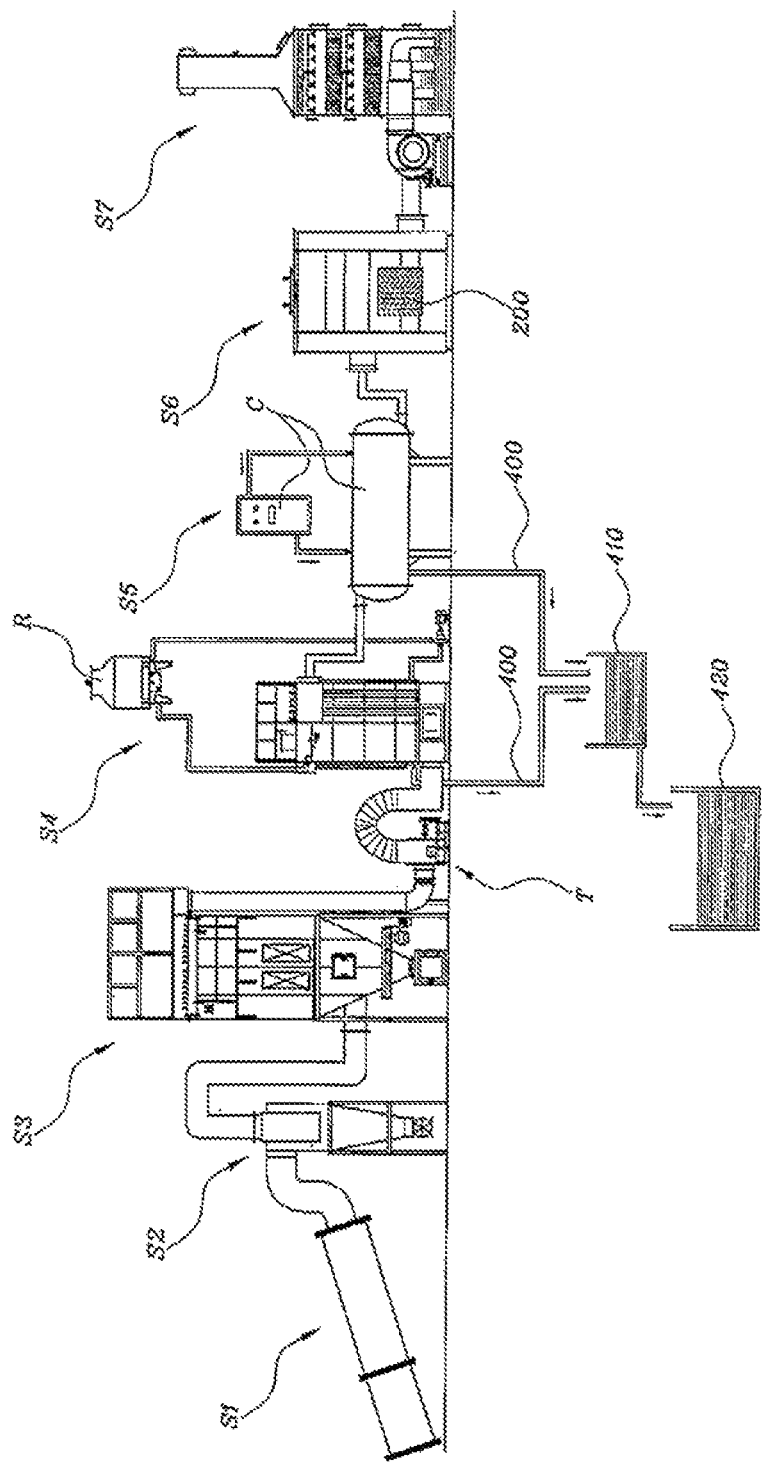
FIG. 2 is a schematic view of an apparatus for removing dust and offensive odor generated from ascon according to the present invention.
Figure 3:
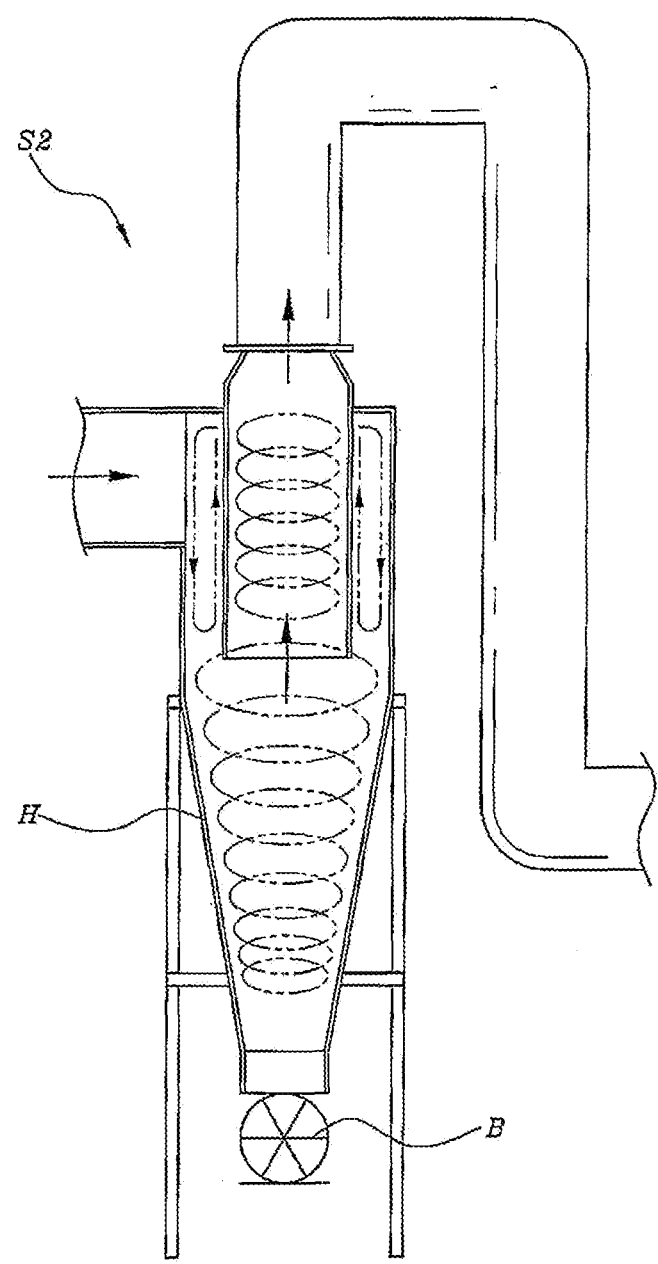
FIG. 3 is a detailed view of a centrifugal dust collection unit in the apparatus of the present invention.
Figure 4:
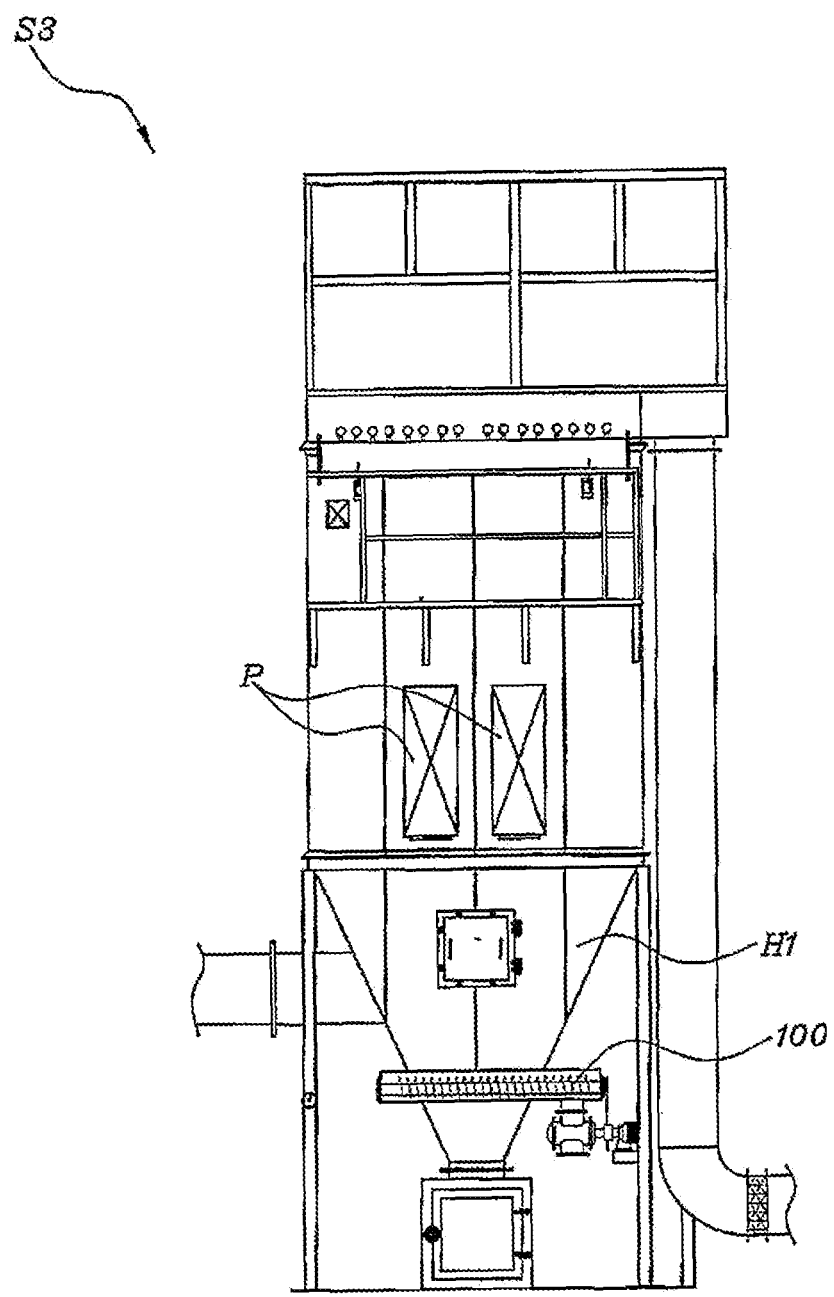
FIG. 4 is a detailed view of a filtration-type dust collection unit in the apparatus of the present invention.
Figure 5:
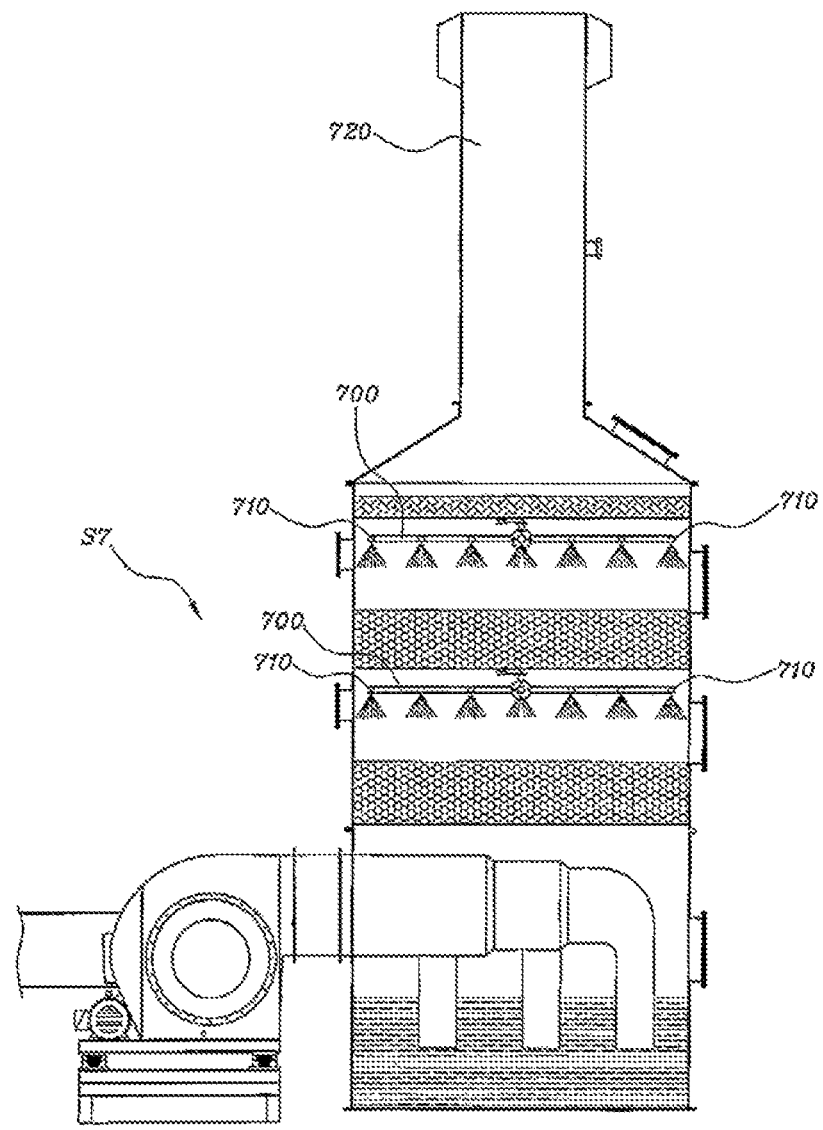
FIG. 5 is a detailed view of a discharge unit in the apparatus of the present invention.

FIG. 1 is a block diagram of an apparatus for removing dust and offensive odor generated from ascon according to the present invention, FIG. 2 is a schematic view of an apparatus for removing dust and offensive odor generated from ascon according to the present invention, FIG. 3 is a detailed view of a centrifugal dust collection unit in the apparatus of the present invention, FIG. 4 is a detailed view of a filtration-type dust collection unit in the apparatus of the present invention, and FIG. 5 is a detailed view of a discharge unit in the apparatus of the present invention.

The apparatus for removing dust and offensive odor generated from ascon according to the present invention includes: a centrifugal dust collection unit (S2) which forcibly sucks offensive odor-causing materials, harmful gas and dust generated from the ascon, produced in an ascon producing unit (S1), via a pipe so as to discharge the dust having a relatively large particle size via a hopper (H) provided at the lower end thereof to the outside by means of a rotary valve (B) while conveying air and relatively fine dust to a filtration-type dust collection unit (S3) via a pipe provided at the upper side thereof; the filtration-type dust collection unit (S3) for filtering the offensive odor-causing materials, harmful gas and fine dust having passed through the centrifugal dust collection unit (S2) by means of a filter (P) while discharging the remaining fine dust or the like to the outside by a screw 100 provided at the lower end of the hopper (H); a first cooling unit (S4) for condensing the harmful gas and offensive odor-causing materials of 150° C., supplied from the filtration-type dust collection unit (S3), by cooling the same to 40~50° C.

using a cooling tower (R) and thus removing and separating the moisture and the offensive odor-causing materials; a second cooling unit (S5) for condensing the offensive odor-causing materials and harmful gas of 40~50° C., having passed through the first cooling unit (S4), by re-cooling the same to 20° C. or lower by a condenser (C) and thus removing and separating the moisture and offensive odor-causing materials so as to prevent a white plume phenomenon; an adsorption unit (S6) for removing volatile organic compounds (VOCs) by adsorbing and filtering the offensive odor-causing materials and harmful gas of 20° C., having passed through the second cooling unit (S5), using a active carbon filter 200; and a discharge unit (S7) configured such that spray pipes 700 are provided therein in stages so as to remove water-soluble offensive odor-causing materials in the air, from which the volatile organic compounds (VOCs) have been removed via the adsorption unit (S6), by spraying water via a plurality of spray nozzles 710 provided at each of the spray pipes 700, and a discharge pipe 720 is provided at the upper side thereof so as to discharge fresh air.

Hereinafter, the apparatus for removing dust and offensive odor generated from ascon according to the present invention will be described in more detail.

The reference numeral "S1" indicates a general ascon producing unit. This general ascon producing unit (S1) is configured such that an aggregate transferred from a cold bin to a conveyor belt passes through a dryer to remove moisture from the aggregate, the moisture-removed aggregate is heated to a temperature at which the aggregate can be suitably mixed with asphalt oil (AP oil), the heated aggregate passes through a hot elevator, a hot screen and a hot bin to adjust the particle size thereof, and then the particle size-adjusted aggregate is introduced into a mixer and then mixed with a suitable amount of heated asphalt oil (AP oil) supplied from an asphalt oil storage tank through a measuring tank, thereby producing ascon, and the dust and offensive odor generated from the produced ascon is delivered. Particularly, in the case wherein ascon is produced using a new aggregate, when the heated aggregate is mixed with AP oil, when the produced ascon is loaded on a truck or when waste ascon is regenerated, the temperature rises to about 150° C., and, at this high temperature, offensive odor-causing materials, harmful gas, dust and the like are generated.

Next, the reference numeral "S2" indicates a centrifugal dust collection unit. This centrifugal dust collection unit (S2) is configured such that the it forcibly sucks the offensive odor-causing materials, harmful gas and dust, supplied from the ascon producing unit (S1), via a pipe so as to discharge the dust having a relatively large particle size to the outside through a rotary valve (B) and to convey air and relatively fine dust to the following filtration-type dust collection unit (S3) through a pipe provided at the upper side thereof.

That is, when the offensive odor-causing materials, harmful gas and dust supplied from the ascon producing unit (S1) are forcibly sucked via a pipe by the following turbo fan, the dust having a relatively large particle size is discharged to the outside via a hopper (H) through the rotary valve (B), and the air and relatively fine dust is conveyed to the following filtration-type dust collection unit (S3) through a pipe provided at the upper side thereof.

Next, the reference numeral "S3" indicates a filtration-type dust collection unit. This filtration-type dust collection unit (S3) is configured such that the offensive odor-causing materials, harmful gas and fine dust having passed through the centrifugal dust collection unit (S2) are filtered by a filter (P), while the remaining fine dust and the like are discharged to the outside by a screw 100 provided at the lower end of the hopper (H). Here, the power for forcibly sucking the offensive odor-causing materials, harmful gas and dust from the centrifugal dust collection unit (S2) is obtained by the turbo fan (T).

That is, this filtration-type dust collection unit (S3) is configured to filter the fine dust having not been filtered by centrifugal dust collection unit (S2).

Next, the reference numeral "S4" indicates a first cooling unit. This first cooling unit (S4) mainly functions to remove offensive odor-causing materials or harmful gas in addition to fine dust, and is configured such that the harmful gas and offensive odor-causing materials supplied from the filtration-type dust collection unit (S3) are cooled and condensed to 40~50° C. by a cooling tower (R), thereby removing and separating moisture and offensive odor-causing materials. Specifically, the first cooling unit (S4) is configured such that harmful gas and offensive odor-causing materials having a high temperature of 150° C. are cooled to 40~50° C. to liquefy gas, thereby removing oil or other offensive odor-causing materials together with moisture. In the first cooling unit (S4), liquefied oil, offensive odor-causing materials and moisture are discharged to an oil-water separation tank 410 through the pipe 400 and then discharged to a water collection tank 420 for collecting only water, thereby primarily removing offensive odor-causing materials.

The oil-water separation tank 410 and the water collection tank 420 are additionally provided between the first cooling unit (S4) and the following second cooling unit (S5) such that the oil-water separation tank 410 separates harmful oil and water from each other by discharging the cooled and condensed moisture and offensive odor-causing materials via pipes, and the water collection tank 420 collects only water separated from the oil-water separation tank 410.

Next, the reference numeral "S5" indicates a second cooling unit. This second cooling unit (S5) is configured such that the offensive odor-causing materials and harmful gas of 40~50° C., having passed through the first cooling unit (S4), are further cooled and condensed to 20° C. or lower to remove and separate the moisture and offensive odor-causing materials again, thereby preventing a white plume phenomenon. As aforementioned, this second cooling unit (S5) is also connected with the oil-water separation tank 410 and the water collection tank 420 through the pipe 400.

Next, the reference numeral "S6" indicates an adsorption unit. This adsorption unit (S6) is configured to remove volatile organic compounds (VOCs) by adsorbing and filtering the offensive odor-causing materials and harmful gas of 20° C., having passed through the second cooling unit (S5), using a active carbon filter 200.

Next, the reference numeral "S7" indicates a discharge unit. This discharge unit (S7) is configured such that spray pipes 700 are provided therein in stages so as to remove water-soluble offensive odor-causing materials in the air, from which the volatile organic compounds (VOCs) have been removed via the adsorption unit (S6), by spraying water via a plurality of spray nozzles 710 provided at each of the spray pipes 700, and a discharge pipe 720 is provided at the upper side thereof so as to discharge fresh air. That is, this discharge unit (S7) mainly functions to remove water-soluble offensive odor-causing materials as well as other harmful materials, and is configured to discharge fresh air, that is, unpolluted air through the discharged pipe 720.

As described above, through a series of configurations and processes, environmental pollution can be prevented by removing or minimizing the offensive odor and dust generated in the ascon producing unit by a batch system. Particularly, according to the offensive odor prevention plan, the step for mixing AP oil and heated aggregate and the step for loading the ascon onto a truck, which are considered to be the main steps for generating the offensive odor, are preformed when producing the ascon by using a new aggregate, while the AP oil vapor is condensed so as to be removed by the first cooling unit, and untreated materials are removed by the second cooling unit in consideration of the physical and chemical properties of the AP oil during re-generation of the waste ascon. Therefore, the apparatus of the present invention is mounted at the rear end of an existing asphalt plant collection facility such that the moisture which is evaporated in the step for drying the AP oil vapor and the aggregate is first condensed and collected, and the volatile organic compounds (VOCs) and the moisture are secondarily condensed and collected by the condenser, the untreated offensive odor-causing materials are collected in the adsorption unit and the discharge unit. Thus, effects of decreasing offensive odor and preventing a white plume phenomenon are exhibited.

The present invention relates to an apparatus for removing dust and offensive odor generated from ascon, and, more particularly, to an apparatus for removing dust and offensive odor generated from ascon, wherein air pollutants, harmful dust and offensive odor generated during the production of ascon are removed or minimized by a batch system, thus preventing environmental pollution.

The invention claimed is:

1. An apparatus for removing dust and offensive odor generated from ascon, comprising:
   a centrifugal dust collection unit (S2) which forcibly sucks offensive odor-causing materials, harmful gas and dust generated from the ascon, produced in an ascon producing unit (S1), via a pipe so as to discharge the dust having a relatively large particle size via a hopper (H) provided at the lower end thereof to the outside by means of a rotary valve (B) while conveying air and relatively fine dust to a filtration-type dust collection unit (S3) via a pipe provided at the upper side thereof;
   the filtration-type dust collection unit (S3) for filtering the offensive odor-causing materials, harmful gas and fine dust having passed through the centrifugal dust collection unit (S2) by means of a filter (P) while discharging the remaining fine dust or the like to the outside by a screw 100 provided at the lower end of the hopper (H);
   a first cooling unit (S4) for condensing the harmful gas and offensive odor-causing materials of 150° C., supplied from the filtration-type dust collection unit (S3), by cooling the same to 40~50° C. using a cooling tower (R) and thus removing and separating the moisture and the offensive odor-causing materials;
   a second cooling unit (S5) for condensing the offensive odor-causing materials and harmful gas of 40~50° C., having passed through the first cooling unit (S4), by re-cooling the same to 20° C. or lower by a condenser (C) and thus removing and separating the moisture and offensive odor-causing materials so as to prevent a white plume phenomenon;
   an adsorption unit (S6) for removing volatile organic compounds (VOCs) by adsorbing and filtering the offensive odor-causing materials and harmful gas of 20° C., having passed through the second cooling unit (S5), using a active carbon filter 200; and
   a discharge unit (S7) configured such that spray pipes 700 are provided therein in stages so as to remove water-soluble offensive odor-causing materials in the air, from which the volatile organic compounds (VOCs) have been removed via the adsorption unit (S6), by spraying water via a plurality of spray nozzles 710 provided at each of the spray pipes 700, and a discharge pipe 720 is provided at the upper side thereof so as to discharge fresh air.

2. The apparatus of claim 1, wherein a turbo fan (T) is provided between the filtration-type dust collection unit (S3) and the first cooling unit (S4).

3. The apparatus of claim 1, wherein an oil-water separation tank 410 and a water collection tank 420 are additionally provided between the first cooling unit (S4) and the second cooling unit (S5) such that the oil-water separation tank 410 separates harmful oil and water from each other by discharging the cooled and condensed moisture and offensive odor-causing materials via pipes, and the water collection tank 420 collects only water separated from the oil-water separation tank 410.

* * * * *